United States Patent [19]

Marcantonio et al.

[11] 4,278,735
[45] Jul. 14, 1981

[54] AQUEOUS METAL COORDINATION COMPOUNDS AS PROTECTIVE COATINGS FOR GLASS

[75] Inventors: Arnold F. Marcantonio; Rodney E. Dailey, both of Muncie, Ind.

[73] Assignee: Ball Corporation, Muncie, Ind.

[21] Appl. No.: 123,235

[22] Filed: Feb. 21, 1980

Related U.S. Application Data

[62] Division of Ser. No. 8,291, Jan. 31, 1979, Pat. No. 4,232,065.

[51] Int. Cl.³ .................... B32B 17/06; B32B 27/06
[52] U.S. Cl. .................................. 428/432; 427/226;
427/380; 427/427; 427/383.5; 427/419.5;
428/425.6; 428/425.9; 428/426; 428/441;
428/523; 428/411; 65/60 B; 65/60 C
[58] Field of Search ............ 428/432, 411, 441, 500,
428/523, 425, 539, 426, 425.9, 425.6; 427/226,
383 B, 380, 419 B, 427, 419 D

[56] References Cited

U.S. PATENT DOCUMENTS

| | | | |
|---|---|---|---|
| 2,121,343 | 6/1938 | Dreyfus | 427/226 |
| 2,838,418 | 6/1958 | Starkweather, Jr. | 427/226 |
| 3,414,429 | 12/1968 | Bruss, Jr. | 427/226 |
| 3,425,859 | 2/1969 | Steigelman | 428/432 |
| 3,445,269 | 5/1969 | Bruss, Jr. | 427/226 |
| 3,498,825 | 3/1970 | Wiens | 428/432 |
| 3,554,787 | 1/1971 | Plymale | 427/419 D |
| 3,663,254 | 5/1972 | Wade | 428/432 |
| 3,926,604 | 12/1975 | Smay | 427/419 D |
| 3,950,591 | 4/1976 | Gliemeroth | 428/432 |
| 3,968,297 | 7/1976 | Saver | 428/432 |
| 3,993,835 | 11/1976 | Miedaner | 428/432 |

FOREIGN PATENT DOCUMENTS

| | | | |
|---|---|---|---|
| 1420315 | 1/1976 | United Kingdom | 428/432 |
| 1425134 | 2/1976 | United Kingdom | 428/432 |

*Primary Examiner*—Ellis P. Robinson
*Attorney, Agent, or Firm*—Gilbert E. Alberding

[57] ABSTRACT

Coordination compounds having good stability in aqueous systems are used to treat glass surfaces at elevated temperatures, the coordination compounds being represented by the general formula $Y_2MX_6$ wherein Y is an alkali metal, hydrogen or ammonium, M is tin, titanium or zirconium and X is a halogen, generally fluorine or chlorine. The glass surfaces so treated are rendered chemical resistant and when treated by conventional cold-end coatings exhibit excellent strength, scratch resistance and chemical durability.

4 Claims, No Drawings

AQUEOUS METAL COORDINATION COMPOUNDS AS PROTECTIVE COATINGS FOR GLASS

This is a division of application Ser. No. 8,291, filed 01/31/79 now U.S. Pat. No. 4,232,065.

The subject invention relates to the treatment of glass surfaces for such articles of commerce as jars, bottles, tumblers and the like and particularly to the treatment of the outer surfaces of such articles which may be subjected to an abrasive contact with similar articles or with equipment associated with the manufacture or handling of such articles.

When glass articles are first formed they have their maximum strength subsequent to their formation, but such articles lose their strength as a result of abrasion and scratching as they contact each other during subsequent operations including filling, capping and packaging. According to the particular products with which they are filled, such glass articles may also be subject to washing, sterilizing or vacuum treatment resulting in additional abrasive contact against other glass articles and equipment.

As is known in the art, the problem of contact abrasion to glassware has been substantially alleviated by various protective surface treatments that are applied immediately upon formation or at least prior to packaging of the glass articles. One basic surface treatment relates to vapor deposition wherein prior to annealing various metallic compounds that pyrolitically decompose upon contact with heat are applied to freshly formed glass to render metallic oxide surface layers on the glass articles. Exemplary of a widely used metallic oxide treatment is the formation of tin oxide on glass surfaces by exposure to stannic chloride vapors. The tin oxide surface treatment, when present in films less than that which would cause objectionable light interference and iridescence, produces a surface condition which, when further coated with an organic lubricating material, is lubricous and highly resistant to abrasion damage. A somewhat similar mechanism may be employed utilizing titanium tetrachloride.

While stannic or titanium halides do not decompose to form a metallic oxide layer on glass surfaces until exposed to temperatures in the order of about 600° F., to 1200° F., it has been found that titanium or stannic chloride vapors are subject to hydrolysis through exposure to moisture associated with the immediate atmosphere. Because of the moisture it has been necessary to protect the treatment gases from hydrolysis by utilizing moisture-free inert gases or properly constructed equipment. At any rate, the problem of maintaining a relatively water-free condition has in and of itself created substantial processing difficulties. In spite of the various systems to prevent hydrolysis of these metallic compounds it still does occur in actual practice to some degree and has posed problems in that still objectionable by-products are formed, viz, highly acidic products are formed that corrode and pollute the working environment.

The present invention relates to a particular family of special protective coating compositions that are applied not by vapor deposition processes but by spray processes utilizing a water base without the noxious and objectionable vapors of the prior art that often corrode the environment. The subject water-base compositions when applied provides strengthening, lubricity, scratch resistance, water resistance, luster and other properties such as stability at high temperatures.

Accordingly, an object of the instant invention is to provide protective coatings for glass articles.

Another object of the present invention is to provide an improved protective coating for simple application at the hot end of a glass forming machine as a water surface spray for glass articles.

Another main object of the present invention is an improved protective composition comprising stable coordinating compounds containing tin, titanium or zirconium along with fluorine or chlorine.

Further, another object of the present invention is to provide a haze-free protective coating for increasing the strength as well as scratch resistance and chemical durability of glass articles.

Another object of the present invention is to provide an aqueous spray system for hot-end coating newly formed glass articles having no noxious or objectionable characteristics as associated with previous anhydrous $SnCl_4$ and $TiCl_4$ materials.

Other and further objects of the invention will be obvious upon an understanding of the illustrative embodiments about to be described or will be indicated in the appended claims, and various advantages not referred to herein which would occur to one skilled in the art upon employment of the invention in practice.

Strength and chemical durability improvements in glass articles are highly desirable since they permit the use of thinner-walled articles which reduces the cost thereof. In the past glassware is often treated internally in order to curtail detrimental decomposition of the inside walls of ware. This treatment is generally necessary for certain containers, especially those that house liquors and pharmaceutical goods. In the past, glassware has been treated with sulfur oxide compounds to improve the chemical durability or inertness of the ware. However, the sulfur oxides were not entirely successful due to the toxicity and operational hazards encountered. More recently, glassware has also been treated with various decomposable chloro-fluorohydrocarbons while the ware is above the decomposition temperature of these compounds. These prior art approaches have their limitations. The coordination compounds herein disclosed provide effective chemical durability when applied to the external and internal portions of hot glassware.

One aspect of the subject invention relates to decreasing the tendency of glass surfaces to exhibit atom or ion interchange with contacting phases associated with boundary phenomenon. In accordance with this invention there is described a method and articles formed by treating the surfaces of glassware while at an elevated temperature with a solution containing a coordination compound, said compound being represented by the formula $Y_2MX_6$ wherein Y is an alkali metal, hydrogen or ammonium, M is titanium, tin or zirconium and X is a halogen. Furthermore, in accordance with the present invention there is also provided a method of increasing the abrasion resistance and strength of a glass article, said method comprising applying to the surface of said glass article while at an elevated temperature an aqueous solution containing coordination compound having the general formula $Y_2MX_6$ wherein Y is an alkali metal, hydrogen or ammonium, M is titanium, tin or zirconium and X is a halogen, the temperature of the glass being sufficient to immediately and substantially completely vaporize the water content of said solution, the temperature of the glass being at least about 425° C., and above the decomposition temperature of said coordination compound, annealing said article so treated at a temperature of at least about 590° C., to thereby decompose said coordination compound on the surface of said glass article, and thereafter treating said article with water insoluble organic compound selected from the group consisting of polyethylene, polypropylene, polystyrene, polyurethane, fatty acids and their derivatives and mixtures thereof.

The particular family of compounds that have been found most advantageous in carrying out the subject invention are those compounds which may be referred to as coordination compounds having a central atom of a metal such as titanium, zirconium or tin and having an oxidation number of +4 and coordination number of 6 with the oxidation numbers of the liquid being from zero for YX and 1 for X. The class of coordination compounds embraced herein include the types which may be represented by the general formula $MX_4(YX)_2$ wherein M=Ti, Sn, or Zr, X=F, Cl, Br, I and Y=$NH_4$, Na, K, H, Li or other quaternary amines. Those compounds may be readily prepared by known inorganic methods of synthesis and form water stable compositions. These coordination compounds may be readily dissolved in water and may be admixed in a range from between about 2 and about 50 weight percent in accordance with this invention. These solutions may be readily applied to hot glass articles and are highly reactive therewith at the hot end of an individual section glass forming machine. The solutions may be readily applied by simple spraying techniques whereby a thin film of the solutions is deposited upon the hot glass surface.

There are a large number of organic compounds that may be used to coat the glass surface after exposure to the coordination compounds herein described. Thus, the glass article that has been previously treated in with the coordination compound is progressively cooled over a period of time and then subject to a treatment such as by spraying of an organic material. These organic materials are generally olefinic polymers. An example of such organic materials may be cited polyethylene, polypropylene, polystyrene, polyurethane, polyvinyl alcohols, fatty acids and their derivatives and mixtures thereof.

The term "hot-end" coating means a treatment applied to hot glass objects very shortly after forming while the objects are still hot from forming, i.e., from the forming temperature down to approximately 600° F., for soda-lime glass objects, the normal temperature range being approximately 1100° F., to about 800° F. Hot-end treatment in accordance with this invention improves glass object surface properties such as abrasion resistance when coupled with an organic "cold-end coating." Hot-end treatments also reduce hot-end damage such as belt checks, hot-end scuffs and glass sticking which function to reduce the strength of glass object.

The term "cold end" coating means a treatment after annealing to provide glass objects with improved lubricity and/or abrasion resistance, usually in combination with an inorganic "hot end" treatment as already stated. Cold end chemicals are usually organic chemical based and are applied generally at between about 200°–400° F.

After the glass articles are coated with the coordination compounds herein described, they enter an annealing lehr, are heated, and are thereafter progressively cooled to about 400° F., and lower when they are exposed to an organic material, generally an aqueous composition containing olefin polymers or alkali metal salts of fatty acids, as already described. When the second coating is dried, the resultant coated article in accordance with this invention has a scratch resistance value which is unexpectedly and superior to that of a glass surface having either coating alone and are at least equivalent to one coated by conventional titanium and tin chloride as employed in the prior art.

As regards the application of the aqueous solution of the coordination compounds, the temperature of the glass is not too critical, provided it is sufficient to promote formation of the desired coating. In particular, the temperature of the glass articles should be greater than about 590° F., and preferably greater than 700° F., to ensure forming of a clear, haze-free coating. Glass temperatures in the range of from about 900° F., to about 1100° F., are preferred. As for the second coating, the temperature of the articles should be about 200° F., to about 400° F.

The process and composition of this invention find particular utility in providing a hot-end coating for glass containers. For such use, it is readily employed by spraying the glass container after emergence from the forming machine and before entering the annealing lehr.

Although there are several theories under which the particular class of coordination compounds react with the hot glass surface it is hypothesized that increased chemical durability arises from the fluorine ligands attached to the central metal atom and the HF produced when $NH_4F$ is thermally decomposed. It is further theorized that the sodium, potassium, calcium and other metallic ions including magnesium and aluminum react with the fluorine to form unreactive fluoride salts in glass. Such fluoride compounds are known to be extremely inert and water insoluble because of the high crystal lattic energy of the fluoride, compounds so formed. At any rate, the resulting surface treated by the compositions herein described function, inter alia, to improve article abrasion resistance particularly when coupled with an organic lubricant to reduce the tendency for hot-end damage and provide a decorative effect at high coating levels as well as improve the glass surface's resistance to corrosive attack by aqueous systems.

The invention may be appropriately illustrated by the following Examples:

EXAMPLE I

An aqueous solution was prepared containing about 14 weight percent $(NH_4)_2TiF_6$ (0.75 molar) with 0.1 weight percent octylaphenoxy polyethoxy ethanol (Triton X-100) and was sprayed using an American Glass Research Pentahood employing four spray guns rendering a total flow of 1.28 ml/sec on newly formed 8 oz., soda-lime glass jars. The conveyor rate was approximately 60 ft., per minute and the glass surface temperature was about 1000° F. Following this hot-end treatment the containers were passed into an annealing lehr and thereafter annealed at about 1100° F., and then the containers were cold-end coated at about 300° F., with polyethylene based material by using a standard overhead spray means.

EXAMPLE II

An aqueous solution was prepared containing about 36 weight percent $(NH_4)_2SnCl_6$ (about 0.75 molar) and applied by spraying directly on hot containers using the equipment of Example I except the conveyor speed was 120 ft./min. and a total solution flow of about 3.0 ml/sec for the four spray guns. After annealing at about 1100° F., an organic fatty acid was used as cold-end treatment.

EXAMPLE III

An aqueous solution was prepared containing about 12 weight percent $H_2TiF_6$ (about 0.75 molar) and directly applied to 8 oz., soda-lime glass baby food containers that were previously heated in a muffle furnace for about one hour at about 1150° F., and thereafter sprayed for about 6 seconds using a Campbell Hausfeld gun employing about 50 psi air pressure from two feet and at a solution flow rate of about 1.4 ml/sec. The treated containers where thereafter reheated for thirty minutes at about 1150° F., to similate annealing. After completion of this last step the glass containers were given an organic fatty acid cold-end treatment by heating the samples for thirty minutes at 280° F.

EXAMPLE IV

An aqueous solution of about 7.6 weight percent $H_2TiF_6$ (about 0.45 molar) was prepared as in Example I. This solution was applied to baby food jars as recited in Example III. An identical solution was prepared except that it included a concentration of 5 weight percent $NH_4F$ (about 1.5 molar) annealed and thereafter treated with a fatty acid cold-end treatment.

The above containers from Examples I-IV were subjected to the Hartford Reflectance Meter and scratch testing equipment to determine the degree of abrasion resistance. In this procedure two treated containers were moved across each other at a constant rate with from about 5 to about 75 pounds loading, scratching or abrasion was noted by an audible scratching sound. The average of the lowest loads determined at first scratch was then recorded. The higher the average the greater the abrasion resistance and the containers from Examle I were evaluated by this procedure without scratching noted through the entire loading scheme. An average of about 75 pounds was then reported as the maximum whereas those with only cold-end treatment averaged about 9 to about 15 pounds at first scratch. It was noted that freshly formed glassware without hot-end treatment and cold-end treatment scratched readily at about 5 pounds minimum load. The Hartford Reflectance Meter was employed to determine the average hot-end coating level which in all cases was approximately 22 to 35 angstroms computed at $TiO_2$. All the glass containers were clear with no indication of objectionable white haze. The samples of Example II gave a reading of about 70 to about 76 pounds load at first scratch and gave a coating level of about 32±4 angstroms computed as $SnO_2$. As for Example III the average scratch resistance was about 30±4 pounds load at first scratch, whereas without hot-end treatment the average was about 9±2, and the average hot-end coating level as about 15±3 angstroms. As regards Example IV the average ware scratch resistance was about 3 to 9 pounds without $NH_4F$ additive and 68 to 78 pounds with the $NH_4$ additive. The average ware hot-end coating levels were approximately 8 angstroms and 28±6 angstroms ($TiO_2$) respectively.

EXAMPLE V

This Example relates to the chemical durability of internal glass surfaces of glassware. Eight-ounce baby food jars were treated with 0.75 m concentration of the coordination compounds as indicated in the following table:

|   | Internal Treatment | Titrant Volume |
|---|---|---|
| A. | $H_2O$ | 1.30 ± 0.71 ml |
| B. | $(NH_4)_2TiF_6$ | 0.35 ± 0.07 |
| C. | $(NH_4)_2ZrF_6$ | 0.75 ± 0.64 |
| D. | $(NH_4)_2TiCl_6$ | 0.50 ± 0.00 |
| E. | 1,1-difluoroethane[a] | 0.16 ± 0.09 |
| F. | Control (water blank) | 0.00 ± 0.00 |

[a] One cfh with air at 20 cfh for one second each.

Except for the 1,1-difluoroethane, all treatments were via Badger air brush, spraying 0.4 ml inside the preheated container for about 5 seconds from a distance of 15 cm with rotation of the container of approximately 100 rpm. The internal treatment for Samples B, C and D had about 0.1 percent octylphenoxy polyethoxy ethanol therein along with the above-cited amount of coordination compound. One hundred and fifty millileters of distilled water was placed in the treated containers and retorted for about one hour at 15 psi pressure. The resulting solutions were then titrated with 0.02 N $H_2SO_4$ to phenolphthalein end point. The higher the quantity of acid required is indicative of higher sodium migration and less chemical durability to sodium leaching during retort.

The compositions herein include the coordination compounds and such compositions are easily handled and applied by regular air spray equipment or atomization mounted adjacent to conventional handling conveyors. The protective coatings therefore may be applied with little or no major changes in the normal glassware procedure of moving the glassware from the forming apparatus through the regular annealing lehr and other conventional glassware treating processes and apparatus.

It will be seen that an improved aqueous protective coating system has been disclosed herein for glassware, particularly suited for spray application which exhibits significantly improved protective property when combined with conventional secondary coatings, such as polyethylene coatings. Improved characteristics such as scratch resistance and chemical durability are markedly improved by the coating combined with good clear color and lustre characteristics.

The foregoing detailed description has been given for clearness of understanding only, and no unnecessary limitations are to be understood therefrom. The invention is not limited to the exact details shown and described, for obvious modifications will occur to those skilled in the art.

What is claimed is:

1. A coated glass article having improved chemical durability and scratch resistance, said coated article being formed by applying to the surface of said article while it is at a temperature of at least 425° C., an aqueous solution comprising of from 5 to about 30 weight percent of compound having $MX_6^{-2}$ ions wherein M is titanium, tin or zirconium and X is a halogen, said M being the central atom in the compound and having an oxidation number of $+4$ and a coordination number of 6, the temperature of the glass being sufficient to immediately and substantially completely vaporize the water content of said solution, annealing said coated article, applying thereafter to said article an organic material selected from the group consisting of polyethylene, polypropylene, polystyrene, polyurethane, and fatty acids and their derivatives and mixtures thereof.

2. A coated glass article having improved chemical durability, said coated article being formed by applying to the surface a coordination compound at a temperature of at least 425° C., and above the decomposition temperature of said coordination compound, said compound being represented by the formula $Y_2MX_6$ wherein Y is an alkali metal, hydrogen or ammonium, M is titanium, tin or zirconium and X is a halogen, said M being the central atom in the compound and having an oxidation number of +4 and a coordination number of 6, said article having a titrant value less than about 0.75 ml of 0.02 N $H_2SO_4$, the coating formed by said compound being greater than about 8 angstroms and having a ware scratch resistance of more than 30 pounds load abrasion to audible scratching.

3. The coated article of claim 2 wherein the halogen is fluorine.

4. The coated article of claim 2 wherein the halogen is chlorine.

* * * * *